United States Patent
Mallikarjunan (10) Patent No.: US 9,380,555 B2
(45) Date of Patent: Jun. 28, 2016

(54) SHARED TERTIARY CHAIN FOR IMPROVED LTE THROUGHPUT

(71) Applicant: Apple Inc., Cupertino, CA (US)

(72) Inventor: Raghuveer Mallikarjunan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/500,822

(22) Filed: Sep. 29, 2014

(65) Prior Publication Data

US 2015/0094055 A1    Apr. 2, 2015

Related U.S. Application Data (60) Provisional application No. 61/884,112, filed on Sep. 29, 2013.

(51) Int. Cl.
| | |
|---|---|
| H04W 88/06 | (2009.01) |
| H04W 76/02 | (2009.01) |
| H04W 64/00 | (2009.01) |
| G01S 19/36 | (2010.01) |
| H04W 76/06 | (2009.01) |

(52) U.S. Cl.
CPC ............ *H04W 64/00* (2013.01); *G01S 19/36* (2013.01); *H04W 76/025* (2013.01); *H04W 76/064* (2013.01); *H04W 76/026* (2013.01); *H04W 88/06* (2013.01)

(58) Field of Classification Search
CPC .. H04W 28/0215; H04W 64/00; H04W 88/06
USPC ............................................ 455/426.1, 552.1
See application file for complete search history.

(56) References Cited

U.S. PATENT DOCUMENTS

| | | | |
|---|---|---|---|
| 2005/0141464 A1* | 6/2005 | Willey | H04W 68/00 370/337 |
| 2008/0220807 A1 | 9/2008 | Patel et al. | |
| 2011/0312288 A1* | 12/2011 | Fu | H04B 1/406 455/88 |
| 2012/0026039 A1 | 2/2012 | Ganeshan et al. | |
| 2013/0201890 A1* | 8/2013 | Swaminathan | H04W 88/06 370/311 |

* cited by examiner

*Primary Examiner* — Olumide T Ajibade Akonai
*Assistant Examiner* — Martin Chang
(74) *Attorney, Agent, or Firm* — Meyertons, Hood, Kivlin, Kowert & Goetzel, P.C.

(57) ABSTRACT

In a wireless communication device that has LTE and 1× capabilities and multiple receive chains, this application provides for sharing non-LTE receive chain(s) and/or unused LTE receive chain(s) for 1× tune-away events to improve LTE throughput by not interrupting LTE data transmission on the LTE active receive chain(s).

8 Claims, 7 Drawing Sheets

SHARED TERTIARY CHAIN FOR IMPROVED LTE THROUGHPUT

PRIORITY CLAIM

This application claims the benefit of priority from U.S. Provisional Patent application Ser. No. 61/884,112, entitled "Shared Tertiary Chain for Improved LTE Throughput" and filed Sep. 29, 2013, which is fully incorporated herein by reference for all purposes to the extent not inconsistent with this application.

BACKGROUND

This application is directed to wireless communications and, more particularly, to shared tertiary chain between GPS and 1x to improve LTE throughput on primary and secondary chains in wireless communications.

Electronic devices such as portable computers and cellular telephones are often provided with wireless communication capabilities. For example, electronic devices may use long-range wireless communication circuitry such as cellular telephone circuitry and WiMAX (IEEE 802.16) circuitry. Electronic devices may also use short-range wireless communication circuitry such as WiFi® (IEEE 802.11) circuitry and Bluetooth® circuitry.

In some devices, it may be desirable to support multiple radio access technologies. For example, it may be desirable to support newer radio-access technologies for handling data sessions and older radio-access technologies for supporting voice calls. Examples of different radio-access technologies that have been used in cellular telephones include Global System for Mobile Communications (GSM), Universal Mobile Telecommunications System (UMTS), Code Division Multiple Access (CDMA) (e.g., CDMA2000 including standards such as CDMA2000 1xRTT or 1x), and Long Term Evolution (LTE).

In certain single radio LTE implementation, LTE and 1x operate in a hybrid mode of operation. This means that while LTE is operating using the single radio (i.e., in data traffic mode), the LTE operation can get interrupted periodically by 1x tune-aways. In this way, the single radio can periodically tune-away from an active LTE connection to check for paging messages, etc. on the 1x system, as well as, e.g., to measure the RF conditions.

A tune-away, for example, can last approximately 100-200 msec, depending on network equipment design and 1x network performance, but mobile devices can stay on 1x for a much longer time. The following items describe example scenarios that may result in long tune-away times: 1) Voice calls—when the subscriber gets paged and picks up a voice call on the 1x interface, which might list a long time, 2) Idle handoffs—tune-away can last around a second, 3) Registrations—tune-away can last from a second or two to more than 10 seconds if the mobile device finds out that it has to register after tuning-away to 1x, 4) System lost—Tune-aways can last more than 5 seconds, up to tens of seconds. These system lost tune-away could be caused by common RF problems, like coverage holes, pilot pollution, or rapidly changing pilots. These 1x tune-away events can negatively impact LTE throughput.

Therefore, it would be desirable to provide improved ways to support multiple radio access technologies in a single-radio electronic device without reducing LTE throughput.

DETAILED DESCRIPTION

The following detailed description is directed to certain sample embodiments. However, the disclosure can be embodied in a multitude of different ways as defined and covered by the claims. In this description, reference is made to the drawings wherein like parts are designated with like reference numerals within this application.

This disclosure makes reference to various wireless communication devices, such as access point, mobile device, handset, base station, user equipment, Node B, access terminal, eNB and the like. The use of these and other names that may be associated with specific technologies or standards is not intended to indicate or mandate one particular device, one particular standard or protocol, or one particular signaling direction and is expressly intended to not be limiting of the scope of this application in any way. The use of these and other names is strictly for convenience and such names may be interchanged within this application without any loss of coverage or rights.

Various techniques described herein can be used for various wireless communication systems, technologies and/or networks, such as Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication technique employing the teachings herein may be designed to implement one or more standards, such as IS-95, cdma2000, IS-856, W-CDMA, TDSCDMA, GSM, UMTS, LTE, WiFi, WiMAX and other standards. A CDMA network may implement a radio technology such as Universal Terrestrial Radio Access ("UTRA)", cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11 ("WiFi"), IEEE 802.16 "(WiMAX"), IEEE 802.20 ("MBWA"), Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Rel99, Rel5, Rel6, Rel7, and so on) technology, as well as 3GPP2 (IxRTT, 1xEV-DO RelO, RevA, RevB, and so on) technology and other technologies, such as WiFi, WiMAX, WMBA and the like.

Figure 1:
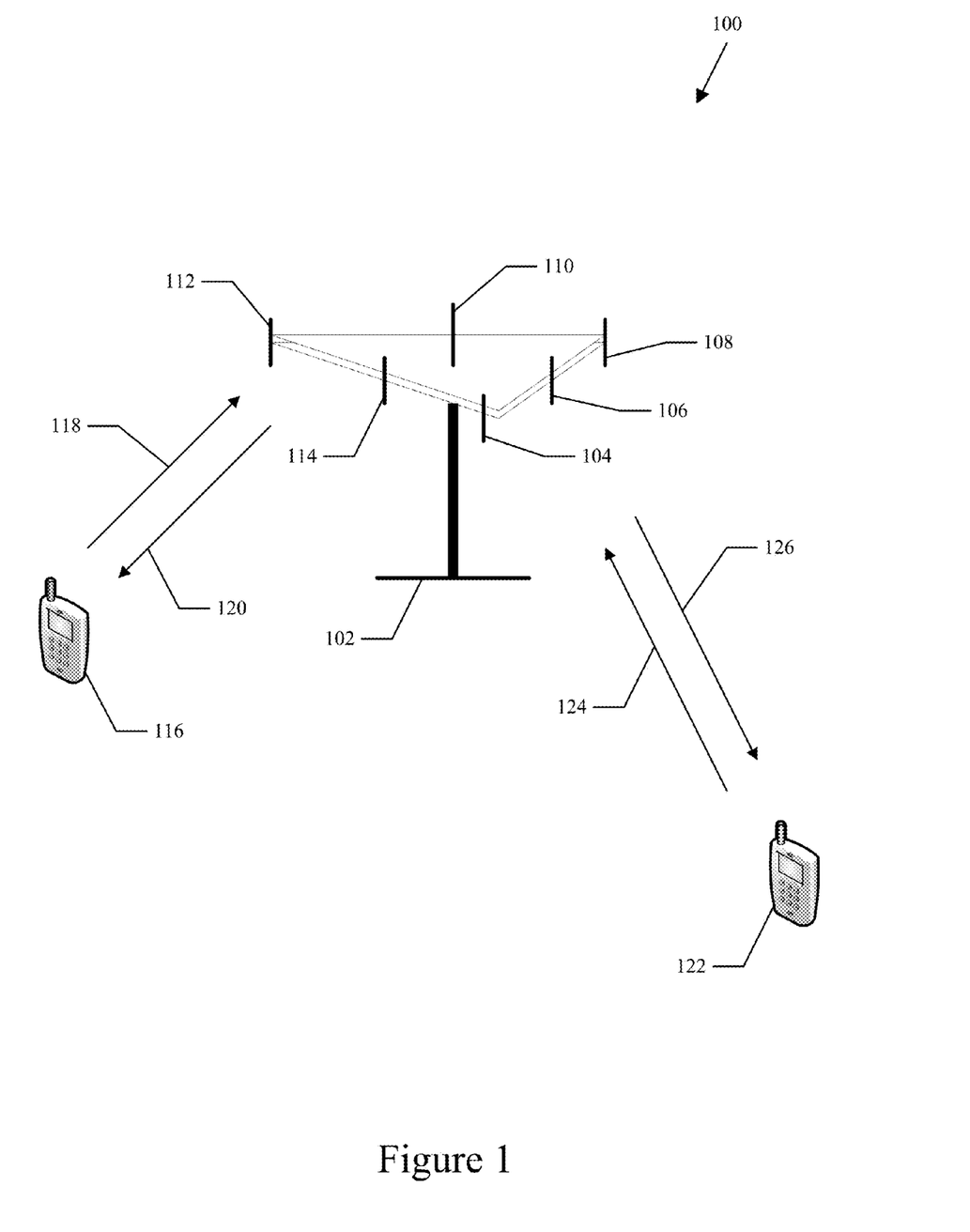
FIG. 1 illustrates an exemplary wireless multiple-access communication system according to certain embodiments.

Referring to the drawings, FIG. 1 illustrates an exemplary wireless multiple-access communication system 100 according to certain embodiments. As shown in FIG. 1, an enhanced Node B (eNB) base station 102 can include multiple antenna groups. One antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group. As shown, user equipment (UE) 116 can be in communication with antennas 112 and 114, where antennas 112 and 114 transmit information to UE 116 over downlink (or forward link) 120 and receive information from UE 116 over uplink (or reverse link) 118. Additionally and/or alternatively, UE 122 can be in communication with antennas 104 and 106, where antennas 104 and 106 transmit information to UE 122 over downlink 126 and receive information from UE 122 over uplink 124. In a frequency division duplex (FDD) system, communication links 118, 120, 124 and 126 can use different frequencies for communication. In time division duplex (TDD) systems, communication links 118, 120, 124 and 126 can use the same frequency or frequencies for communication, but can communicate at differing times.

Each group of antennas and/or the area in which they are designed to communicate can be referred to as a sector of the eNB or base station. In accordance with one aspect, antenna groups can be designed to communicate to mobile devices in a sector of areas (not shown) covered by eNB 102. In communication over downlinks 120 and 126, the transmitting antennas of eNB 102 can utilize beamforming in order to improve the signal-to-noise ratio of downlinks for the different UEs 116 and 122. Also, a base station using beamforming to transmit to UEs scattered randomly through its coverage area can cause less interference to mobile devices in neighboring cells or sectors than a base station transmitting through a single antenna to all of its UEs. In addition to beamforming, antenna groups of a base station, as well as mobile devices, can use other multi-antenna or antenna diversity techniques to send and/or receive information, such as spatial multiplexing, spatial diversity, pattern diversity, polarization diversity, transmit/receive diversity, adaptive arrays, and the like.

Figure 2:
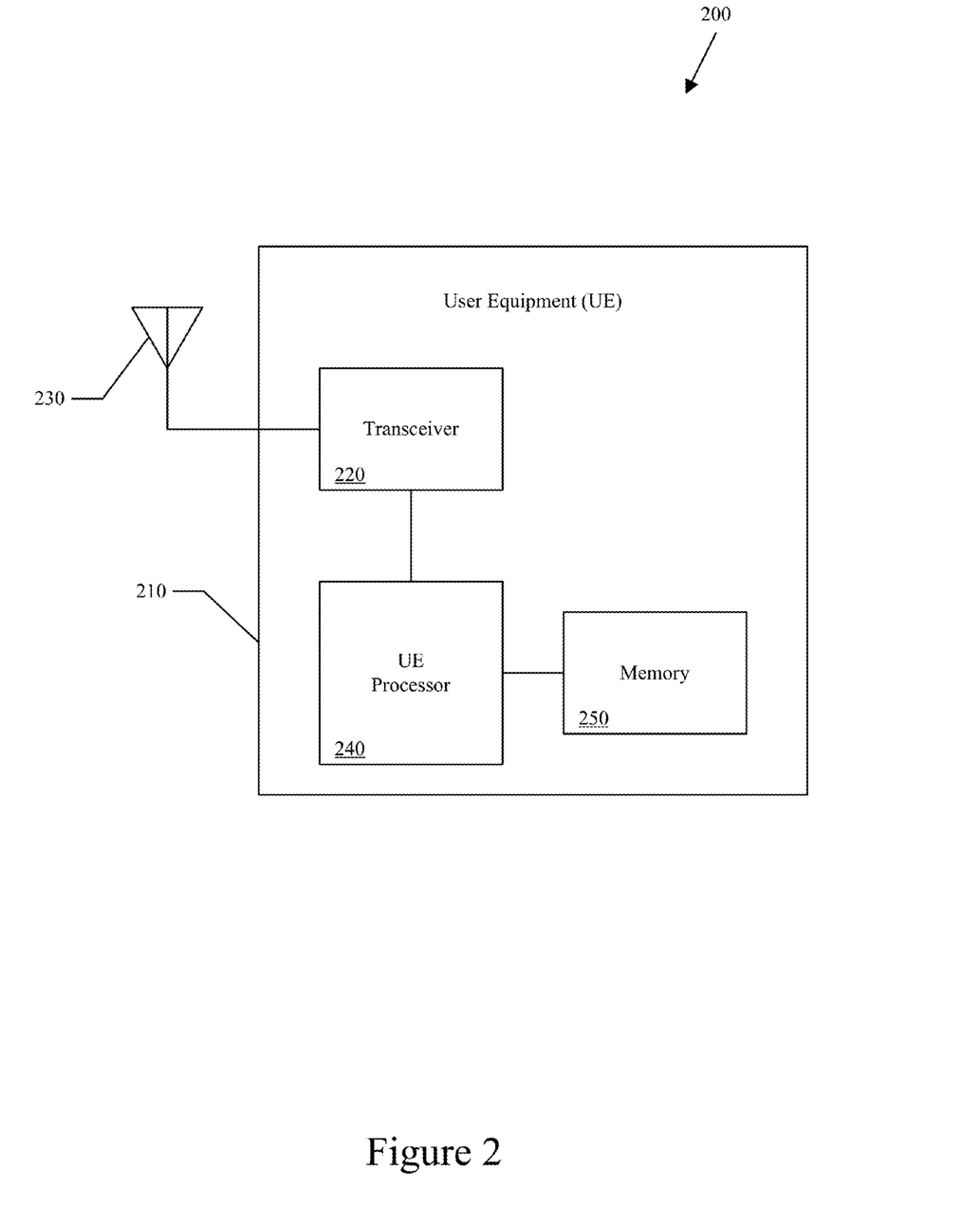
FIG. 2 illustrates a block diagram of an exemplary mobile device or user equipment (UE) according to certain embodiments.

FIG. 2 illustrates a block diagram 200 of an exemplary mobile device, handset (HS) or user equipment (UE) 210 according to certain embodiments. As shown in FIG. 2, UE 210 may include a transceiver 220, an antenna 230, a processor 240, and a memory 250 (which, in certain embodiments, may include memory in a Subscriber Identity Module (SIM) card). In certain embodiments, some or all of the functionalities described herein as being performed by a handset or mobile device may be provided by processor 240 executing instructions stored on a computer-readable medium, such as the memory 250, as shown in FIG. 2. Alternatively, processor 240 and/or memory 250 may be one or more separate processors and/or memories. Additionally, UE 210 may perform uplink and/or downlink communication functions, as further disclosed herein, via transceiver 220 and antenna 230. While only one antenna and one transceiver are shown for UE 210, certain embodiments are equally applicable to multi-antenna and/or multi-transceiver mobile devices. In certain embodiments, UE 210 may include additional components beyond those shown in FIG. 2 that may be responsible for enabling or performing the functions of UE 210, such as communicating with a base station in a network and for processing information for transmitting or from reception, including any of the functionality described herein. Such additional components are not shown in FIG. 2 but are intended to be within the scope of coverage of this application.

Figure 3:
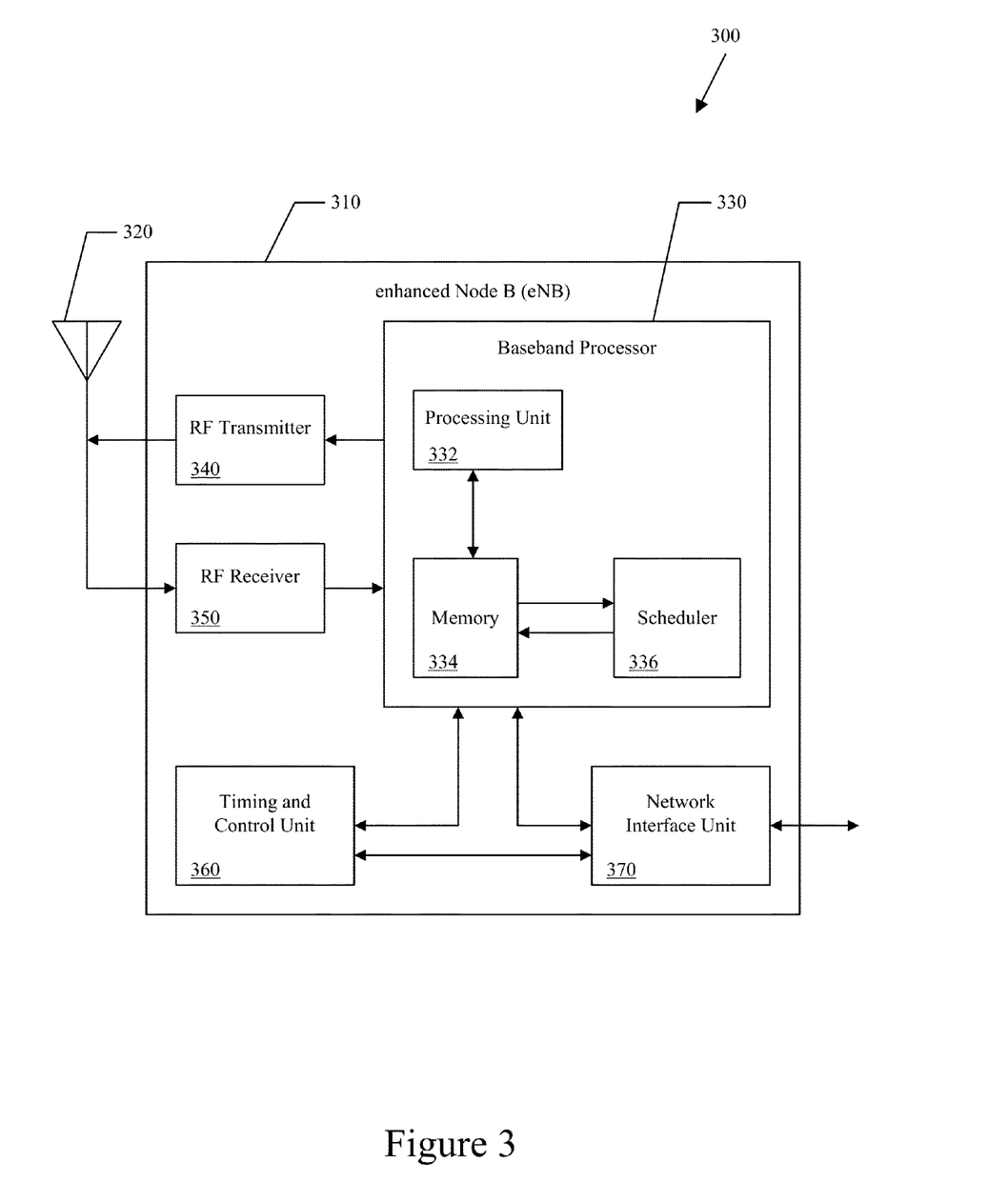
FIG. 3 illustrates a block diagram of an exemplary enhanced Node B (eNB) or similar mobile communication node (e.g., base station, access point, etc.) according to certain embodiments.

FIG. 3 illustrates a block diagram 300 of an exemplary enhanced Node B (eNB) 310 or similar mobile communication node (e.g., base station, access point, etc.) according to certain embodiments. As shown in FIG. 3, eNB 310 may include a baseband processor 330 to provide radio communication with mobile handsets via a radio frequency (RF) transmitter 340 and RF receiver 350 units coupled to eNB antenna 320. While only one antenna and one transceiver set are shown, certain embodiments are applicable to multi-antenna and/or multi-transceiver set configurations. RF transmitter 340 and RF receiver 350 may be combined into one, transceiver unit, and/or duplicated to facilitate multiple antenna communication. Baseband processor 330 may be configured (in hardware and/or software) to function according to a wireless communications standard, such as 3GPP LTE. Alternatively, multiple baseband processors may be included in eNB 310. Baseband processor 330 may include a processing unit 332 in communication with a memory 334 to process and store relevant information for the eNB and a scheduler 336, which may provide scheduling decisions for mobile devices serviced by eNB 310. Scheduler 336 may have some or all of the same data structure as a typical scheduler for an eNB in an LTE system. Alternatively, processing unit 332 and/or memory 334 may be one or more separate processors and/or memories. In certain embodiments, some or all of the functionalities described herein as being performed by an enhanced Node B, access point or base station may be provided by processing unit 332 executing instructions stored on a computer-readable medium, such as memory 334, as shown in FIG. 3.

Baseband processor 330 may also provide additional baseband signal processing (e.g., mobile device registration, channel signal information calculation and/or transmission, radio resource management, etc.) as required. Processing unit 332 may include, by way of example, one or more of the following: a general purpose processor, a special purpose processor, a conventional processor, a digital signal processor (DSP), a microprocessor, a microprocessor in association with a DSP core, a controller, a microcontroller, an Application Specific Integrated Circuits (ASICs), Field Programmable Gate Arrays (FPGAs) circuits, and any other type of integrated circuit (IC) and/or state machine. Some or all of the functionalities described herein as being provided by a mobile base station, a base station controller, a node B, an enhanced node B, an access point, a home base station, a femtocell base station, and/or any other type of mobile communications node may be provided by processing unit 332 executing instructions stored on a computer-readable data storage medium, such as the memory 334 shown in FIG. 3.

In certain embodiments, eNB 310 may further include a timing and control unit 360 and a core network interface unit 370, such as are shown in FIG. 3, each in communication with the other and with baseband processor 330. Timing and control unit 360 may monitor operations of baseband processor 330 and network interface unit 370, and may provide appropriate timing and control signals to these units. Network interface unit 370 may provide a bi-directional interface for eNB 310 to communicate with a core or back-end network (not shown) to facilitate administrative, data-management and/or call-management functions for mobile subscribers operating in the network through eNB 310.

In certain embodiments, base station 310 may include additional components responsible for providing additional functionality, including any of the functionality identified herein and/or any functionality necessary to support the techniques described herein. Although features and elements are described in particular combinations, each feature or element can be used alone without the other features and elements or in various combinations with or without one or more features and elements. Techniques provided herein may be implemented in a computer program, software, or firmware incorporated in a computer-readable storage medium (e.g., memory 334 in FIG. 3) for execution by a general purpose computer or a processor (e.g., processing unit 332 in FIG. 3). Examples of computer-readable storage media include read only memory (ROM), random access memory (RAM), digital registers, cache memory, semiconductor memory devices, magnetic media such as internal hard disks, magnetic tapes and removable disks, magneto-optical media, and optical media such as CDROM disks, digital versatile disks (DVDs), and so on. Such computer-readable storage media may be separate units, may be incorporated as part of one or more other units (e.g., processing unit 332 in FIG. 3), or may be a combination of separate and incorporated units.

Figure 4:
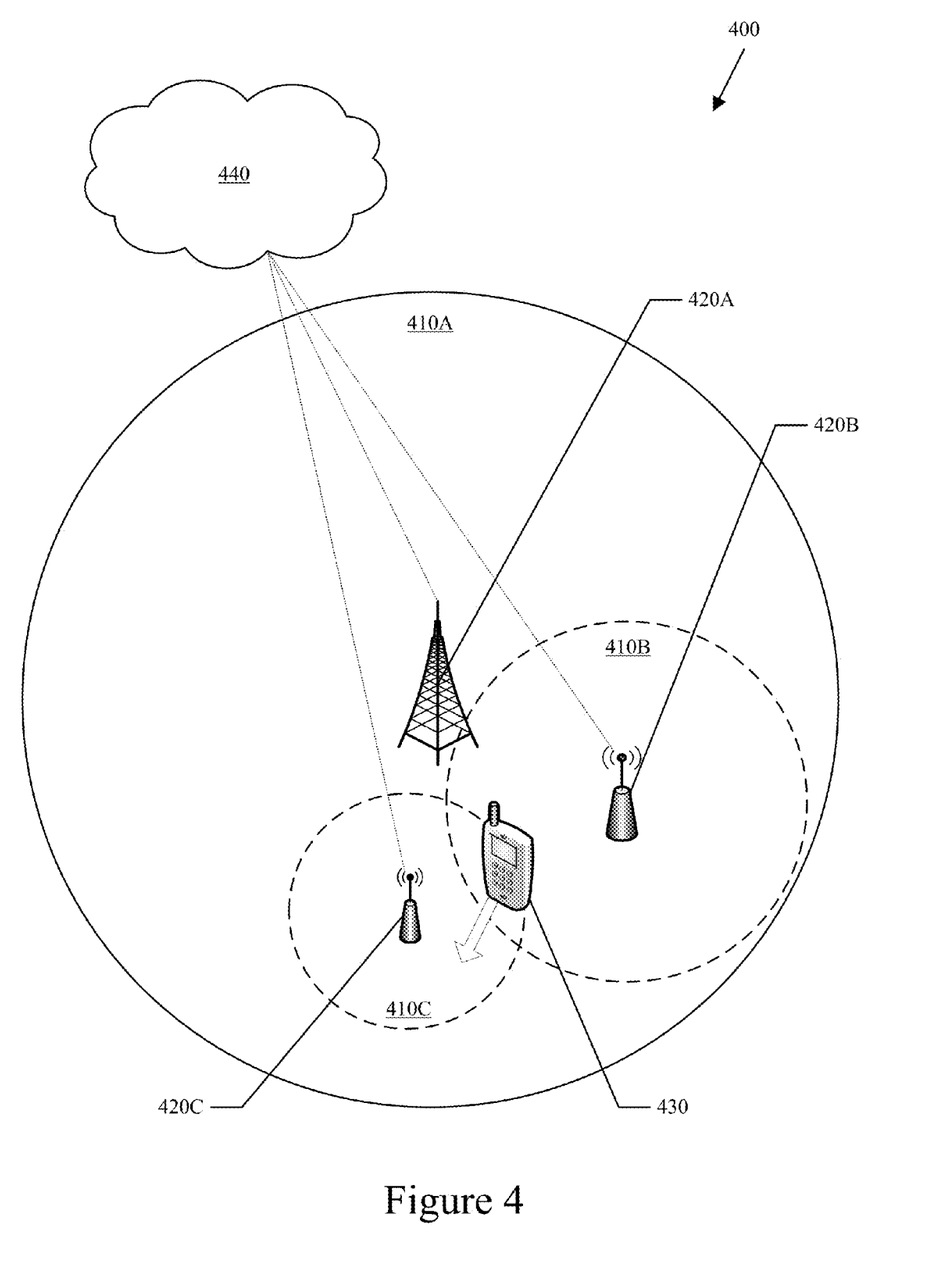
FIG. 4 illustrates an exemplary multi-RAT wireless network according to certain embodiments.

FIG. 4 illustrates an exemplary multi-RAT (radio access technology) wireless network 400 according to certain embodiments. As shown in FIG. 4, a mobile device (handset, UE, etc.) 430 is within the coverage area of multi-RAT wireless network 400. Multi-RAT wireless network 400 can include multiple-technology network coverage pieces. For example, one technology coverage area can be a cell 410A, such as in an LTE coverage area. Within (or partially within) cell 410A coverage area, there can concurrently exist one or more other technology coverage areas, for example cells 410B and 410C, each of which may be a GSM, UMTS, WiMAX, CDMA or even WiFi coverage area. As shown, cells 410B, 410C are within cell 410A and at least partially overlap each other, although this configuration is for illustrative purposes only. Each cell 410 can also include some sort of network access device 420A, 420B and 420C, such as a base station, eNodeB or access point. Each network access device 420 can communicate with one or more mobile devices 430, as well as with a core network 440 (and even, perhaps, with each other). Not shown are possible intermediate network components or system elements that may be between each network access device 420 and core network 440. In certain embodiments, mobile device 430 can be moving within cell 410A and moving out of cell 410B and into cell 410C. In this way, mobile device 430 could possibly communicate with one or more of cells 410A, 410B and 410C.

Figure 5:
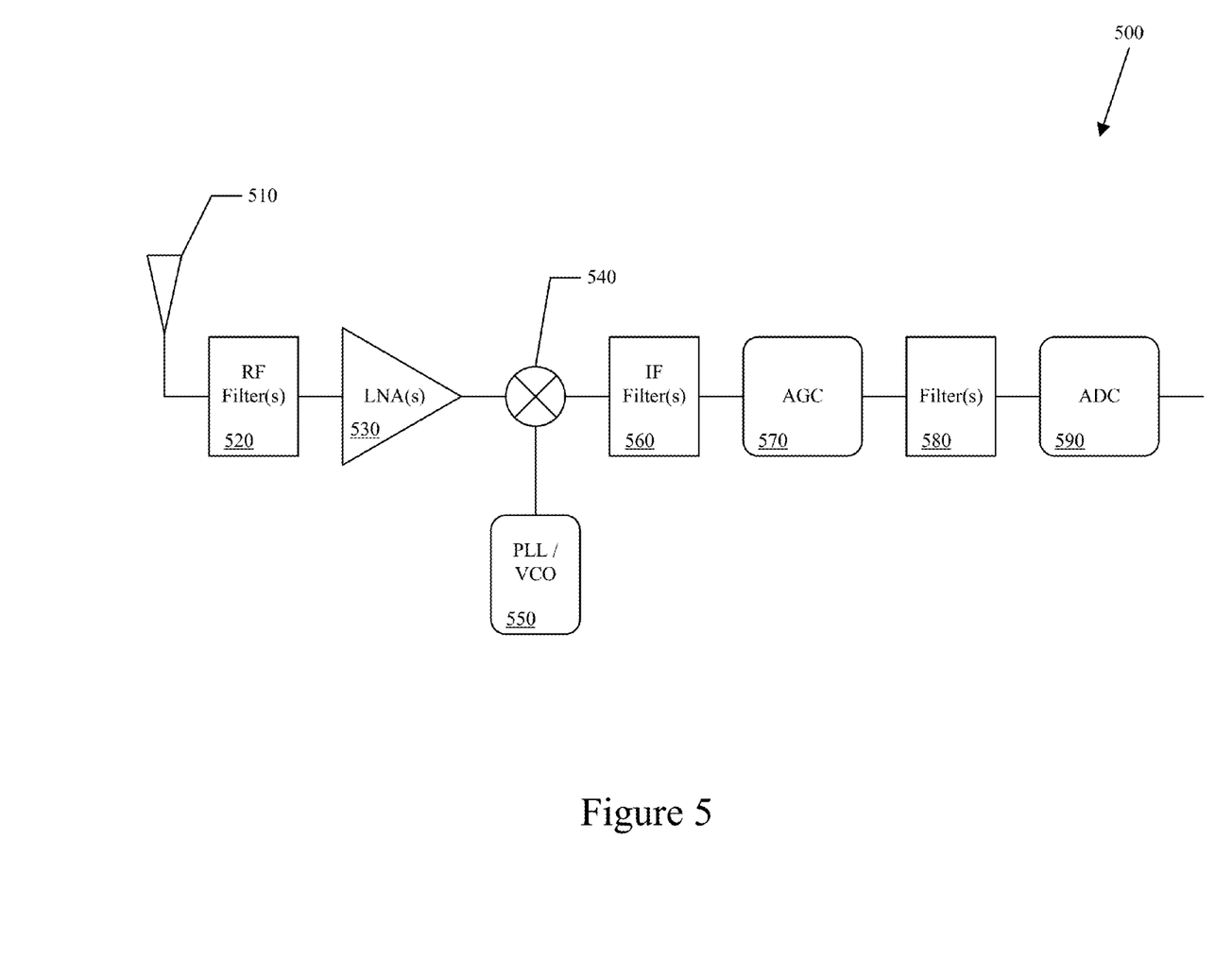
FIG. 5 illustrates an exemplary receive chain architecture according to certain embodiments.

FIG. 5 illustrates an exemplary receive chain architecture 500 according to certain embodiments. As shown in FIG. 5, an antenna 510 can receive the radio frequency (RF) signals, which are then filtered by one or more RF filters 520. The RF filtered signal next passes through one or more low noise amplifiers (LNAs) 530. Next the signal leaves the LNA and enters a mixer 540, which also has as an input a phase-locked loop (PLL)/voltage controlled oscillator (VCO) 550 output. After mixing, the signal passes through one or more intermediate frequency (IF) filters 560 and into an automatic gain control (AGC) 570 module. Finally, the signal may be filtered by one or more filters (580) and then converted from analog to digital form by analog-to-digital converter (ADC) 590. As used in this application, certain embodiments of receive chain architecture 500 can be used with and/or within UE 200, eNB 300 and/or any devices associated with FIGS. 1-4.

Figure 6:
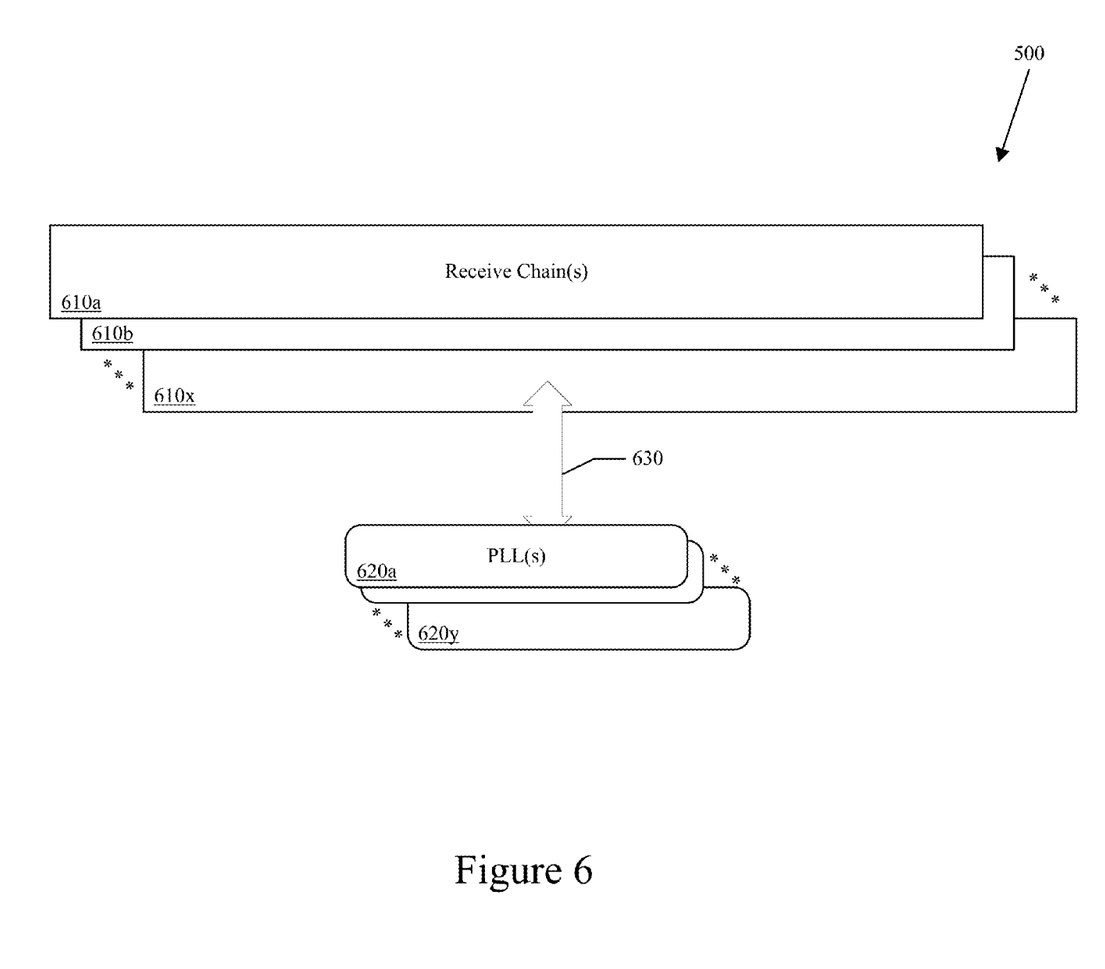
FIG. 6 illustrates an exemplary multi-receive chain architecture according to certain embodiments.

FIG. 6 illustrates an exemplary multi-receive chain architecture 600 according to certain embodiments. As shown in FIG. 6, multiple receive chains 610a-x can include multiple PLLs 620a-y. Not shown are the one or more antennas that may be connected to multiple receive chains 610. Note that it is not necessary that there be a one-to-one correlation between the number of PLLs to receive chains. As used in this application, certain embodiments of multi-receive chain architecture 600 can be used with and/or within UE 200, eNB 300 and/or any devices associated with FIGS. 1-4, in which any one or more of multiple receive chains 610a-x can include some or all of the elements of receive chain architecture 500.

In certain embodiments, a multi-RAT, single-radio handset or user equipment (UE) may include three receive chains with two PLLs. For example, this UE may be able to operate using 4G (e.g., LTE) for data services, but fall back to 2G/3G (e.g., CDMA2000 1xRTT, or just "1x") for voice services, which means that LTE and 1x will operate in a hybrid mode, with LTE traffic being interrupted periodically by a 1x "tune-away." As used herein, a 1x tune-away may be, for example, ceasing reception/processing of LTE incoming data, receiving/listening for/demodulating paging messages that might indicate an incoming call (or no incoming call, as the case may be), and then retuning for continued reception of LTE data. Each 1x tune-away can negatively impact the LTE throughput. The negative impact can be larger when the UE is in a marginal coverage area because the UE may need to wake-up in IS 2000 or paging channel timeline for 1x.

In certain embodiments, the single radio, three receive chains, two PLLs UE may be configured as follows. The primary and secondary receive chains can be used for 1x, EV/DO and/or LTE operation, while the tertiary receive chain can be dedicated for GPS operations. One or both of the two PLLs can be used for one technology with diversity, which means that one PLL can be used to receive LTE data traffic on both the primary and secondary receive chains. This leaves the second PLL to be used for GPS operation on the tertiary receive chain or used for a 1x tune-away one of the primary or secondary receive chains. The potential issue with this configuration is that when a 1x tune-away must happen during a time with LTE data reception is happening, the LTE data reception must be stopped for the 1x tune-away to occur. Also, if GPS is using the second PLL, then the first PLL must also be taken from the LTE reception set-up and used for the 1x tune-away.

Figure 7:
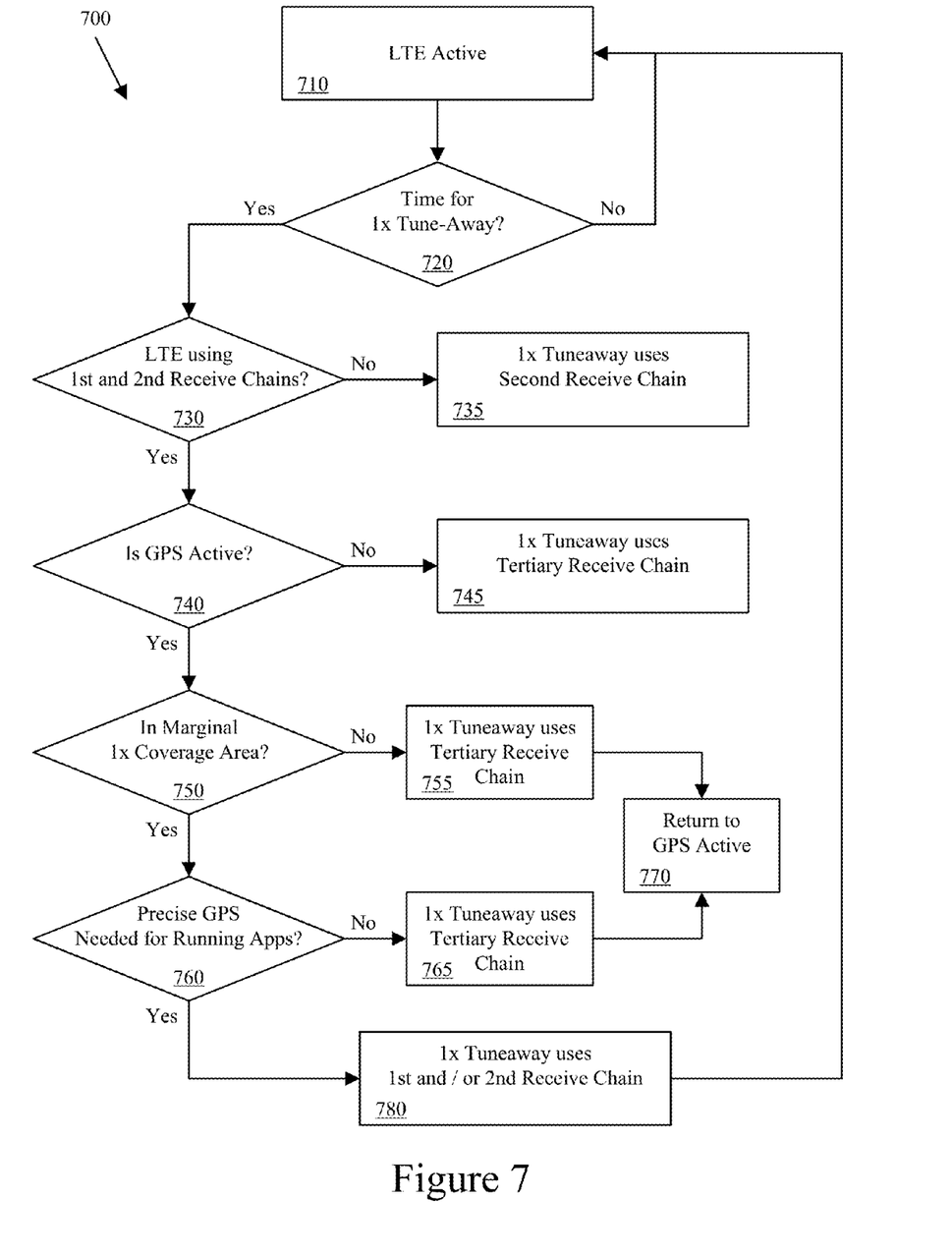
FIG. 7 illustrates an exemplary 1x tune-away flow diagram according to certain embodiments.

FIG. 7 illustrates an exemplary 1x tune-away flow diagram 700 according to certain embodiments. In certain embodiments, a 1x tune-away can be permitted to use the second PLL and the tertiary receive chain if GPS is not using them, or if certain conditions are met, even if GPS is using them. As shown in FIG. 7, at 710, a UE with a single radio and three receive chains is in LTE active mode, i.e., it is actively receiving LTE data. At 720, the UE decides whether it is time for a 1x tune-away. If it is not time for a 1x tune-away, then the UE can continue in active LTE mode at 710. If at 720 it is time for a 1x tune-away, then at 730, the UE can determine whether the LTE active mode is using both the primary and secondary receive chains. If not (and assuming that the LTE active mode is using the primary receive chain, which need not be the case), then the 1x tune-away can use the secondary receive chain (or more generally, the receive chain that is not being used by the LTE active mode).

If the check at 730 indicates that LTE mode is using both the primary and secondary receive chains, then at 740 the UE can determine whether GPS is active, which indicates whether the tertiary receive chain is in use. If at 740 GPS is not active, then at 745 the 1x tune-away can use the tertiary receive chain. If at 740 GPS is active, then at 750, the UE can determine whether it is in a marginal 1x coverage area. If the UE is not in a marginal 1× coverage area, then at 755 the 1× tune-away can use the tertiary receive chain, which means that GPS will temporarily loose use of the tertiary receive chain. After the 1× tune-away is complete from 755, then at 770 the UE can return to GPS active mode.

If the check at 750 indicates that the UE is in a marginal 1× coverage area, then at 760 the UE can determine whether precise GPS is needed for the application or applications that are running and in need of GPS data. If precise GPS data are not needed, then at 765 the 1× tune-away can use the tertiary receive chain, which means that GPS will temporarily loose use of the tertiary receive chain. After the 1× tune-away is complete from 765, then at 770 the UE can return to GPS active mode. If at 760 precise GPS data are needed by the running application(s), then at 780 the 1× tune-away can use the primary and/or the secondary receive chain(s), which means that LTE will temporarily loose use of the one or both of the primary and secondary receive chains. After the 1× tune-away is complete from 780, then at 710 the UE can return to LTE active mode.

In certain embodiments, as discussed herein with reference to FIG. 7, if LTE is using both primary and secondary receive chains (730) and GPS is active (740) and UE is in a marginal coverage area (750) and precise GPS data are needed (760) will the 1× tune-away (720) interrupt the active LTE mode (710) by using one or both of the primary and secondary receive chains (780). In this way, LTE can remain active in most situations.

Certain embodiments may deviate from the certain embodiments described so far. For example, while FIG. 7 is discussed with reference to a UE having three receive chains, techniques of this application can be applicable to fewer or more receive chains. In the case of fewer, (e.g., two) receive chains, then the LTE active mode could be assigned only the primary receive chain (i.e., eliminating the need for the 730 check and 735 no result from that check).

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints or preferences imposed on the overall system. Skilled artisans may implement the described functionality in varying ways for each particular application, but such implementation decisions should not be interpreted as causing a departure from the scope of the disclosed methods.

The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in one or more software modules executed by one or more processing elements, or in a combination of the two. A software module may reside in RAM memory, flash memory, ROM memory, EPROM memory, EEPROM memory, registers, hard disk, a removable disk, a CD-ROM, or any other form or combination of storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added.

What is claimed is:

1. A method for a user equipment (UE) 1× tune-away while the UE is in a long-term evolution (LTE) active mode, the UE including a plurality of receive chains, comprising:
    selecting a UE receive chain from the plurality of receive chains for performing the 1× tune-away, wherein the selecting comprises:
        determining that the LTE active mode is using all LTE-designated receive chains from the plurality of receive chains;
        determining that the UE is not in a marginal 1× coverage area; and
    performing the 1× tune-away a satellite navigation system-designated receive chain at least partly in response to the determining that the LTE active mode is using all LTE-designated receive chains from the plurality of receive chains and that the UE is not in the marginal 1× coverage area.

2. The method of 1, wherein selecting the UE receive chain includes:
    in response to the determining that the LTE active mode is using all LTE-designated receive chains, determining whether the UE is in a satellite navigation system active mode and using the satellite navigation system-designated receive chain from the plurality of receive chains, wherein the determining that the UE is not in a marginal 1× coverage area is in response to the determining that the UE is in the satellite navigation system active mode and using the satellite navigation system-designated receive chain from the plurality of receive chains.

3. A user equipment (UE) apparatus for 1× tune-away while the UE is in a long-term evolution (LTE) active mode, comprising:

a plurality of receive chains; and a processor coupled to the plurality of receive chains, the processor configured to:
- select a UE receive chain from the plurality of receive chains for performing the 1× tune-away, wherein, in selecting the UE receive chain, the processor is configured to:
  - determine whether the LTE active mode is using all LTE-designated receive chains from the plurality of receive chains;
  - determine whether the UE is in a marginal 1× coverage area; and
  - select a satellite navigation system-designated receive chain to perform the 1× tune-away, at least partly in response to the determining that the LTE active mode is using all LTE-designated receive chains from the plurality of receive chains and that the UE is not in the marginal 1× coverage area; and
- perform the 1× tune-away on the UE selected receive chain.

4. The apparatus of claim 3, wherein, in selecting the UE receive chain, the processor is further configured to:
- in response to the determining that the LTE active mode is using all LTE-designated receive chains, determine whether the UE is in a satellite navigation system active mode and using the satellite navigation system-designated receive chain from the plurality of receive chains, wherein the determining that the UE is not in a marginal 1× coverage area is in response to the determining that the UE is in the satellite navigation system active mode and using the satellite navigation system-designated receive chain from the plurality of receive chains.

5. The apparatus of 3, wherein, in selecting the UE receive chain, the processor is further configured to:
- in response to the determining that the UE is in the marginal 1× coverage area, determine whether precise satellite navigation system data are needed by the UE.

6. The apparatus of claim 5, wherein performing the 1× tune-away includes:
- in response to the determining that imprecise GPS data are not needed by the UE, select the GPS-designated receive chain for performing the 1× tune-away.

7. A non-transitory computer-program storage apparatus for a user equipment (UE) 1× tune-away while the UE is in a long-term evolution (LTE) active mode, the UE including a plurality of receive chains, the non-transitory computer-program storage apparatus storing one or more software modules that, when executed by one or more processors, cause the UE to:
- select a UE receive chain from the plurality of receive chains on which to perform the 1× tune-away, wherein, in selecting the UE receive chain, the software modules cause the UE to:
  - determine whether the LTE active mode is using all LTE-designated receive chains from the plurality of receive chains;
  - in response to determining that the LTE active mode is using all LTE-designated receive chains, determine whether the UE is in a satellite navigation system active mode and using a satellite navigation system-designated receive chain from the plurality of receive chains;
  - in response to determining that the UE is in the satellite navigation system active mode, determine whether the UE is in a marginal 1× coverage area; and
  - in response to determining that the UE is in the marginal 1× coverage area, determine whether precise satellite navigation system data are needed by the UE; and
- perform the 1× tune-away on the selected receive chain.

8. The non-transitory computer-program storage apparatus of claim 7, wherein the one or more software modules, when executed, further cause the UE to:
- in response to determining that the LTE active mode is not using all LTE-designated receive chains, select an unused LTE-designated receive chain for performing the 1× tune-away;
- in response to determining that the UE is not in the satellite navigation system active mode, select the satellite navigation system-designated receive chain for performing the 1× tune-away;
- in response to determining that the UE is not in the marginal 1× coverage area, select the satellite navigation system-designated receive chain for performing the 1× tune-away; and
- in response to determining that precise satellite navigation system data are not needed by the UE, select the satellite navigation system-designated receive chain for performing the 1× tune-away.

\* \* \* \* \*